May 11, 1937.                P. R. WHEELER ET AL                2,080,295
BRAKE CONTROL
Filed Nov. 4, 1932                    9 Sheets—Sheet 5
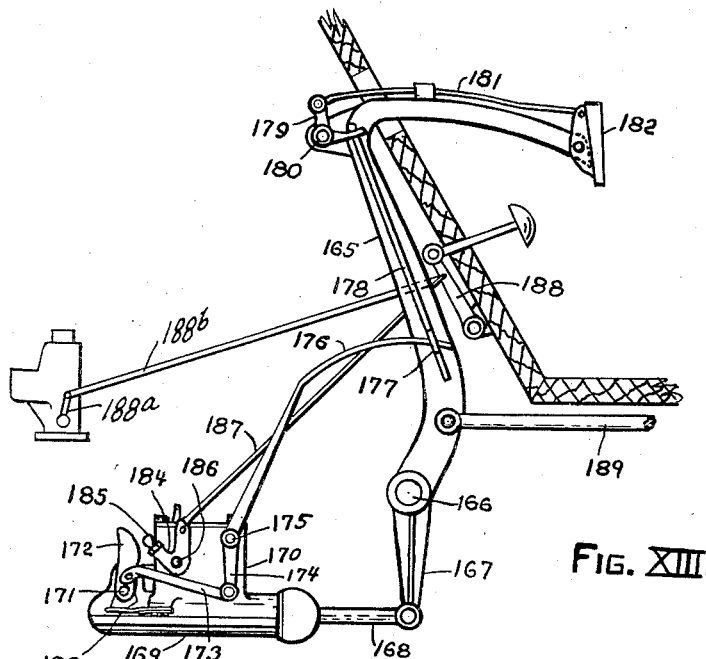
FIG. XIII.
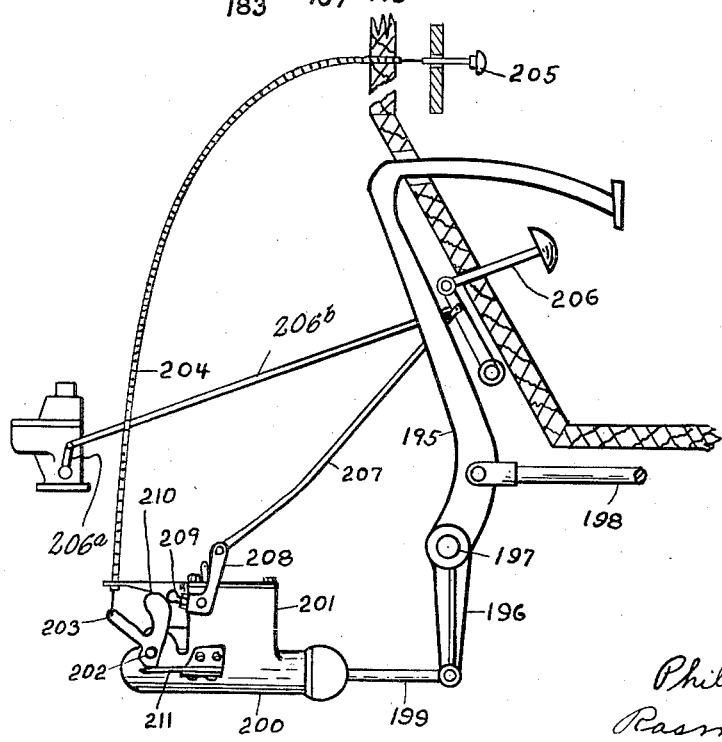
FIG. XIV.
Inventor
Phillip R. Wheeler
Rasmus Christensen
By
Attorney May 11, 1937.  P. R. WHEELER ET AL  2,080,295
BRAKE CONTROL
Filed Nov. 4, 1932   9 Sheets-Sheet 6
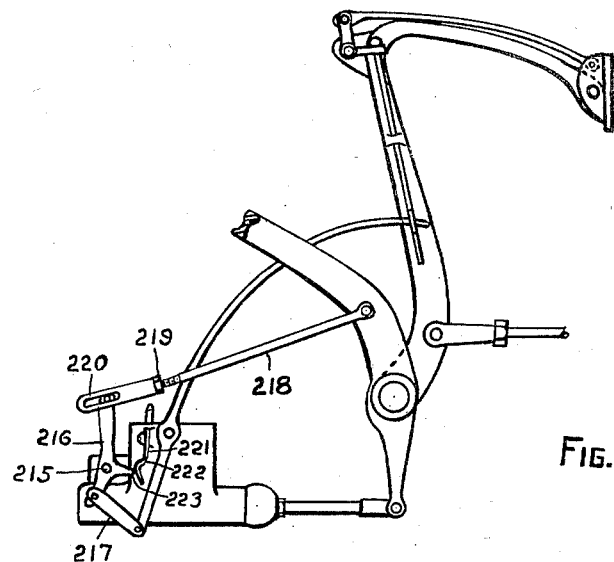
FIG. XV.
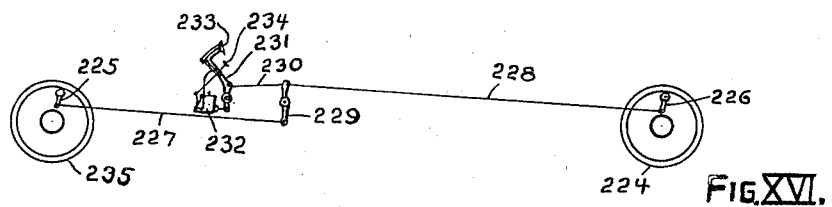
FIG. XVI.
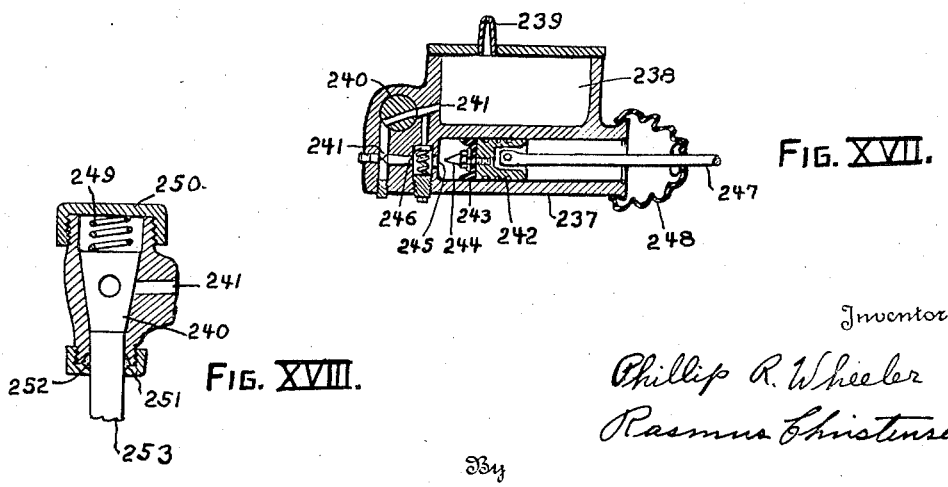
FIG. XVII.
FIG. XVIII.
Inventor
Phillip R. Wheeler
Rasmus Christensen
By
Attorney

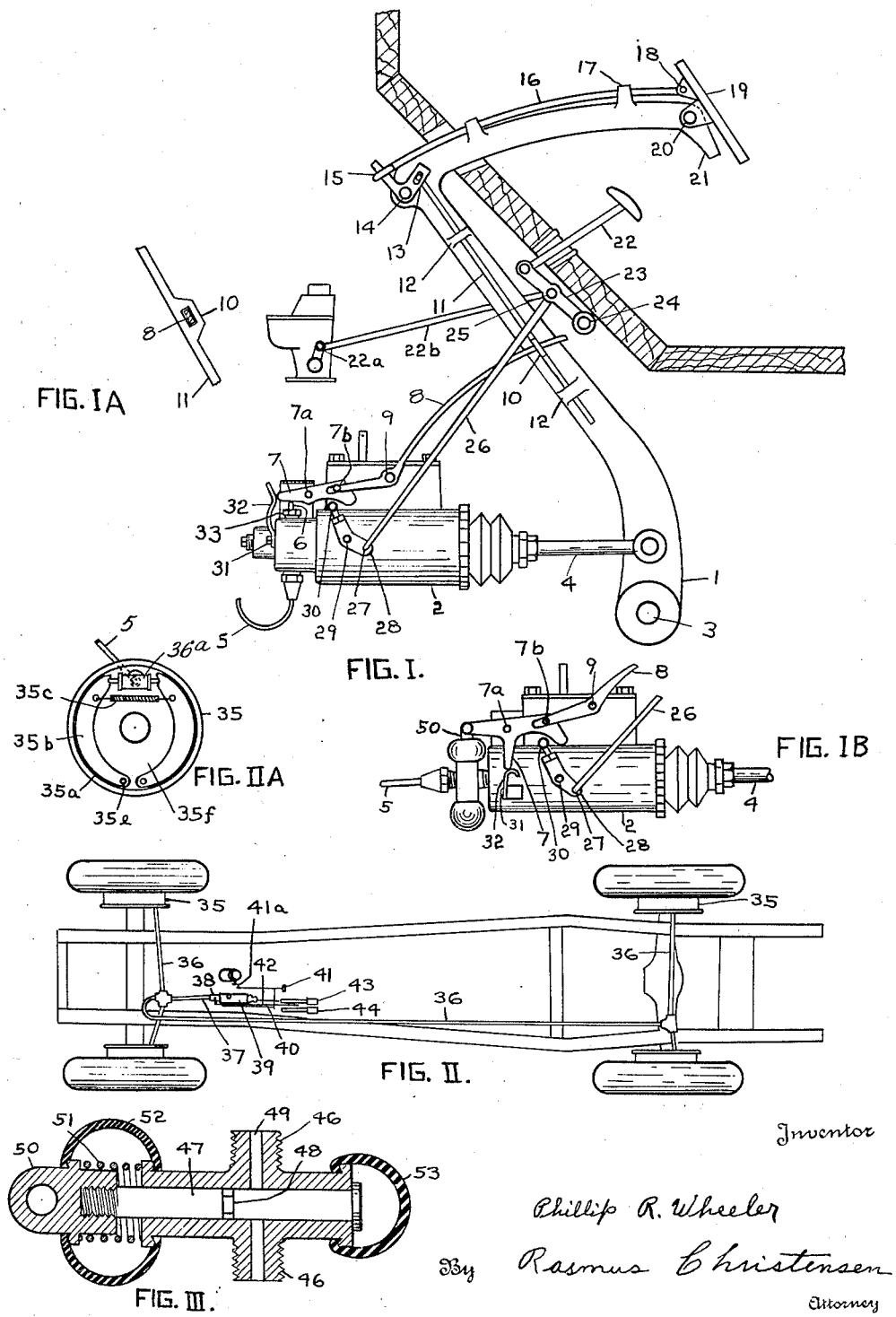

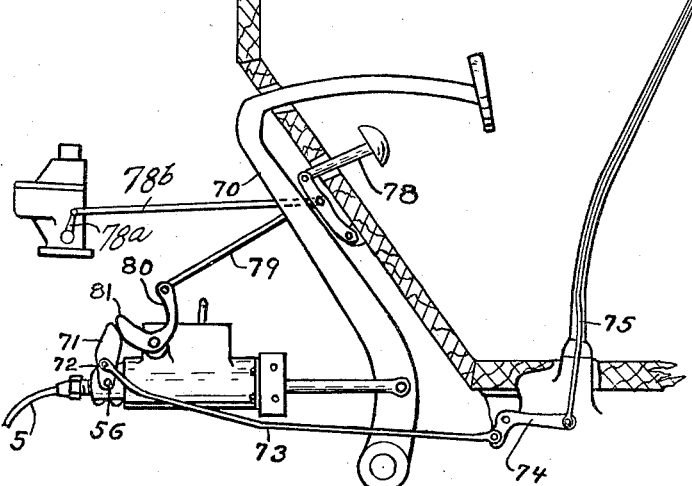

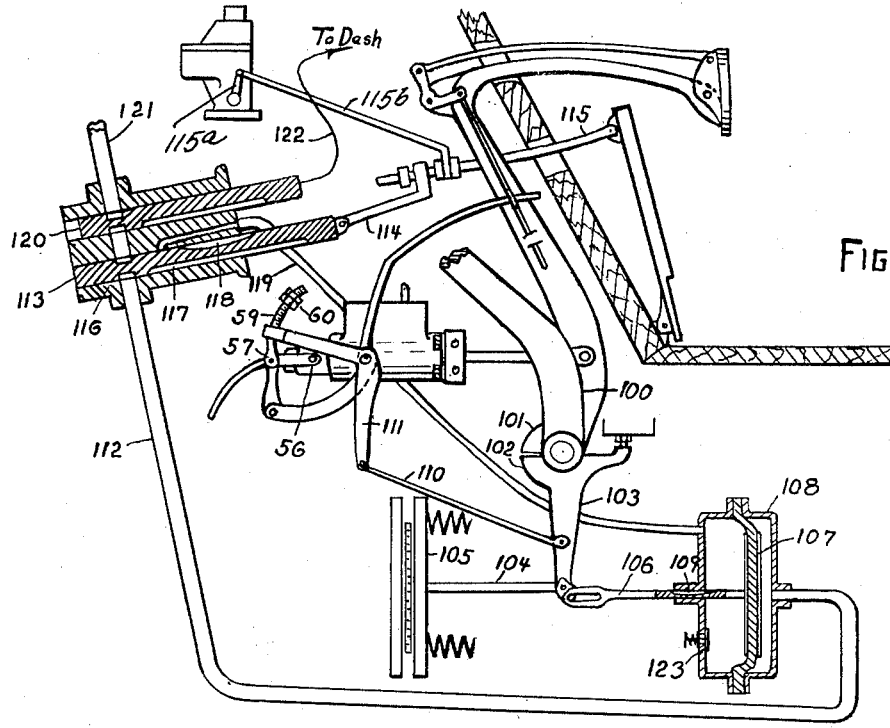
FIG. VIII.
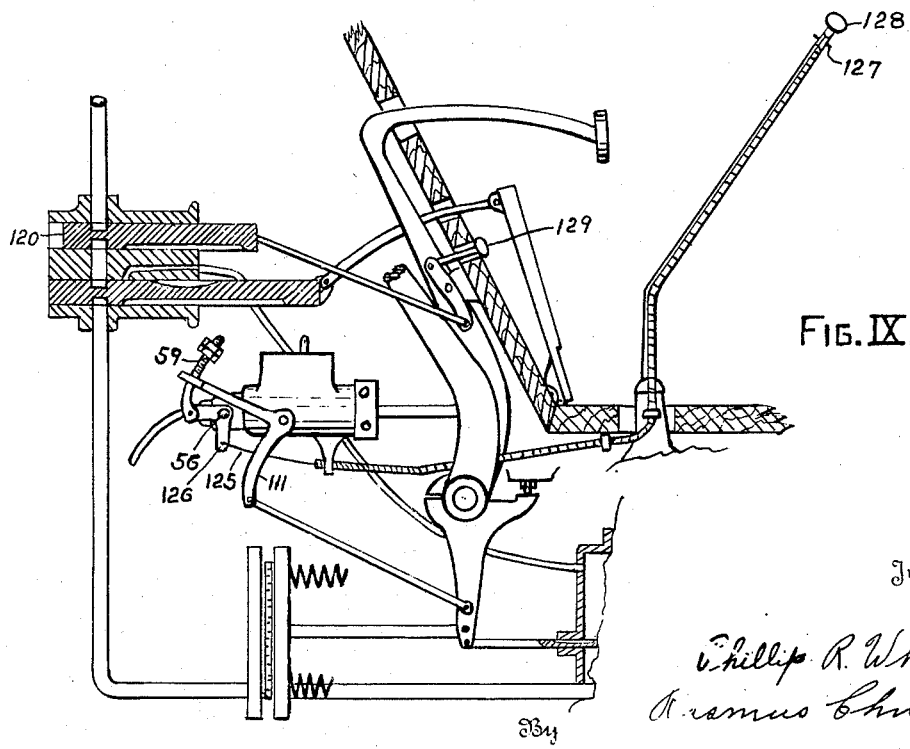
FIG. IX.
Inventors
Phillip R. Wheeler
Rasmus Christensen
By
Attorney

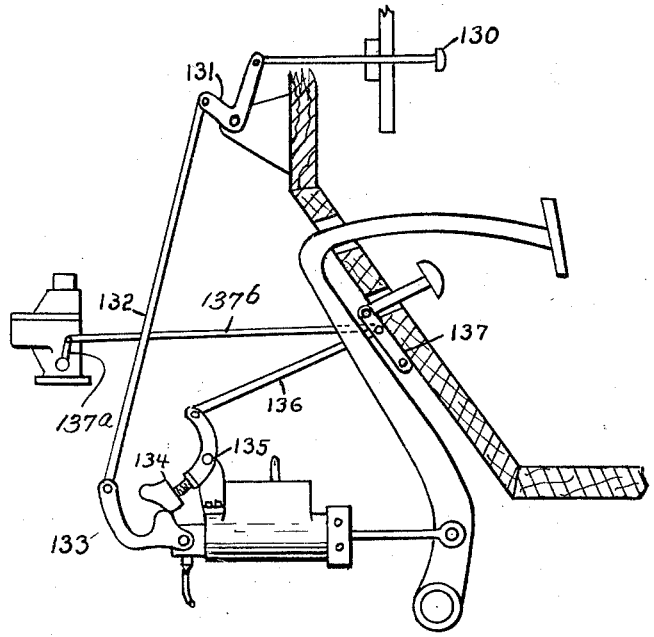
FIG. X.
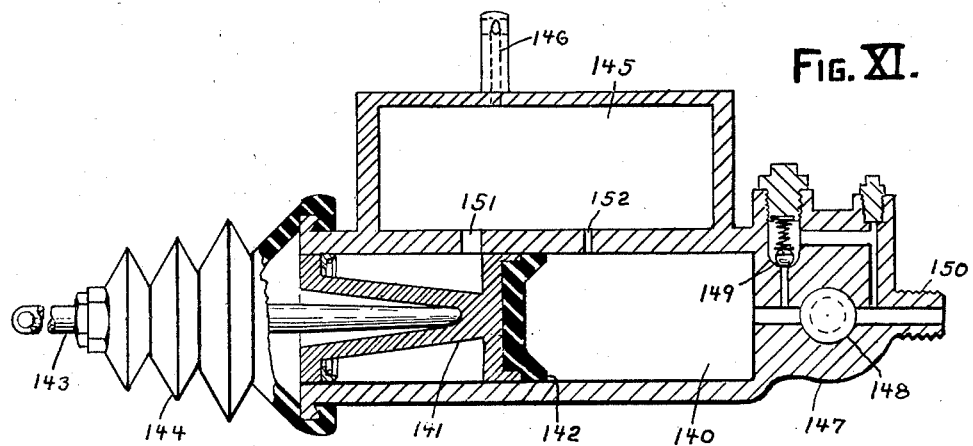
FIG. XI.
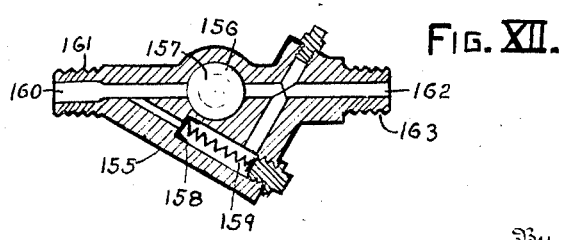
FIG. XII.

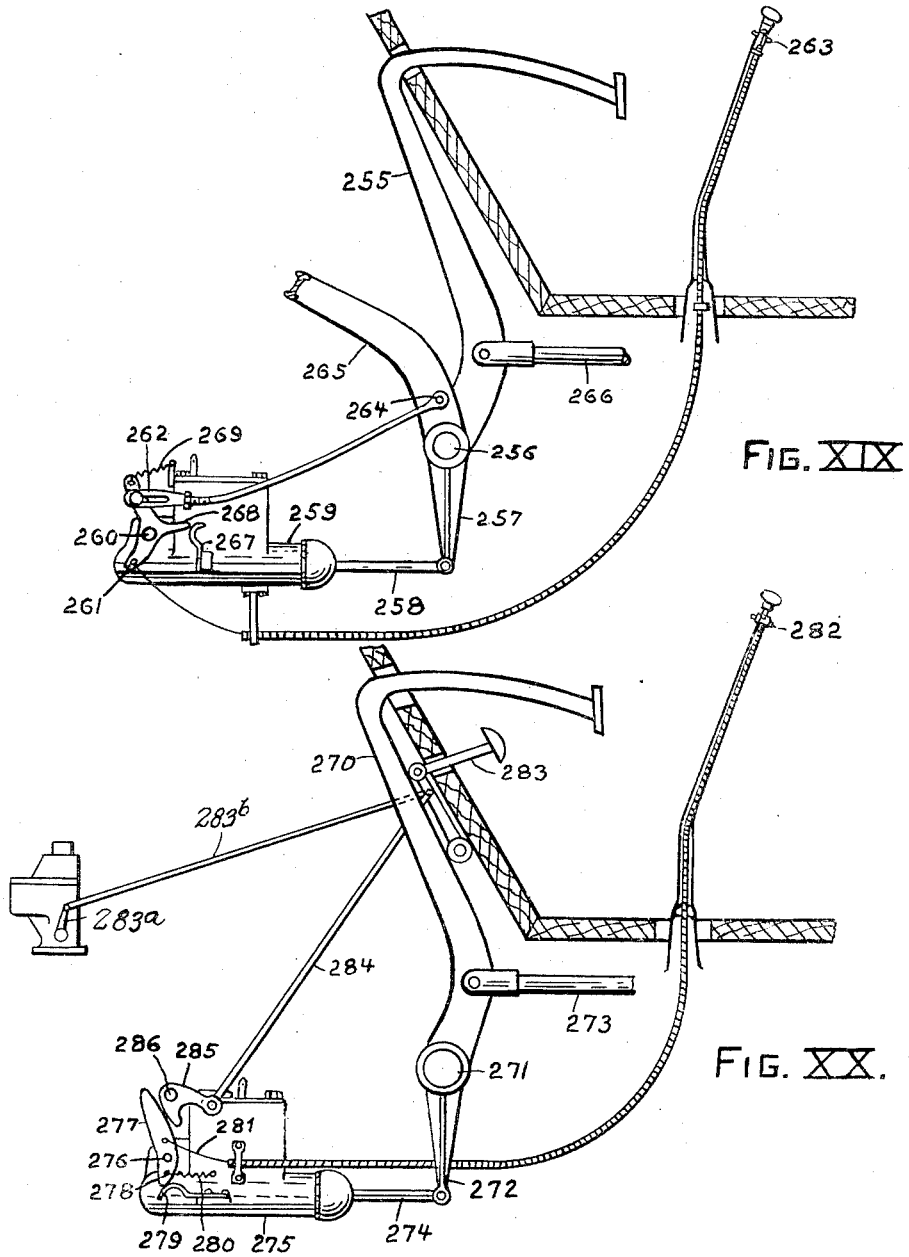

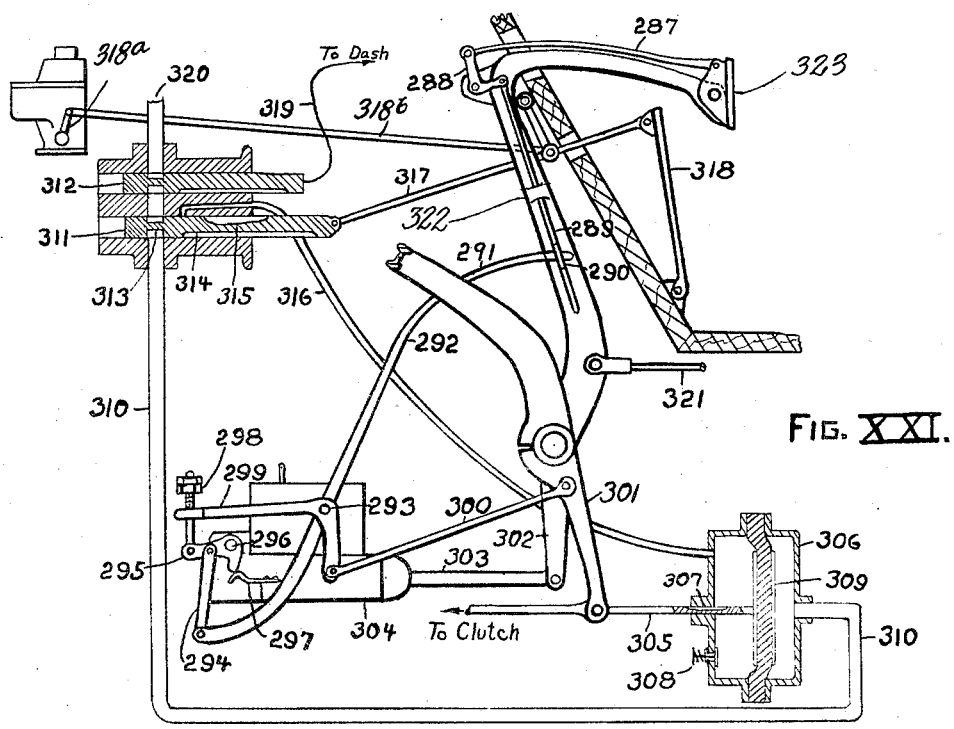
FIG. XXI.
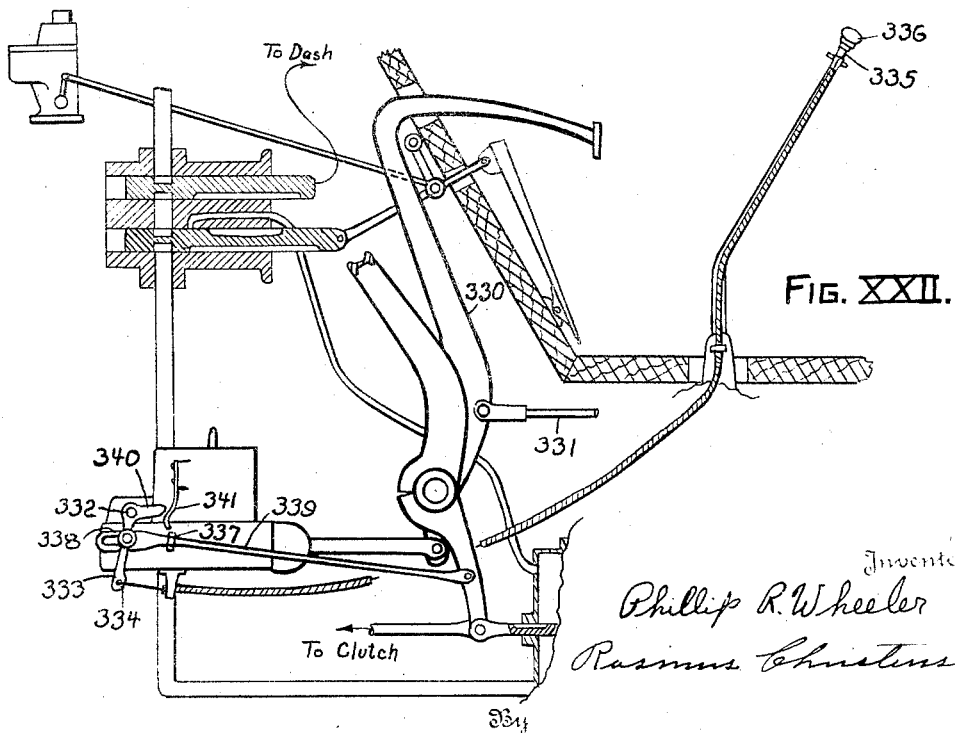
FIG. XXII.

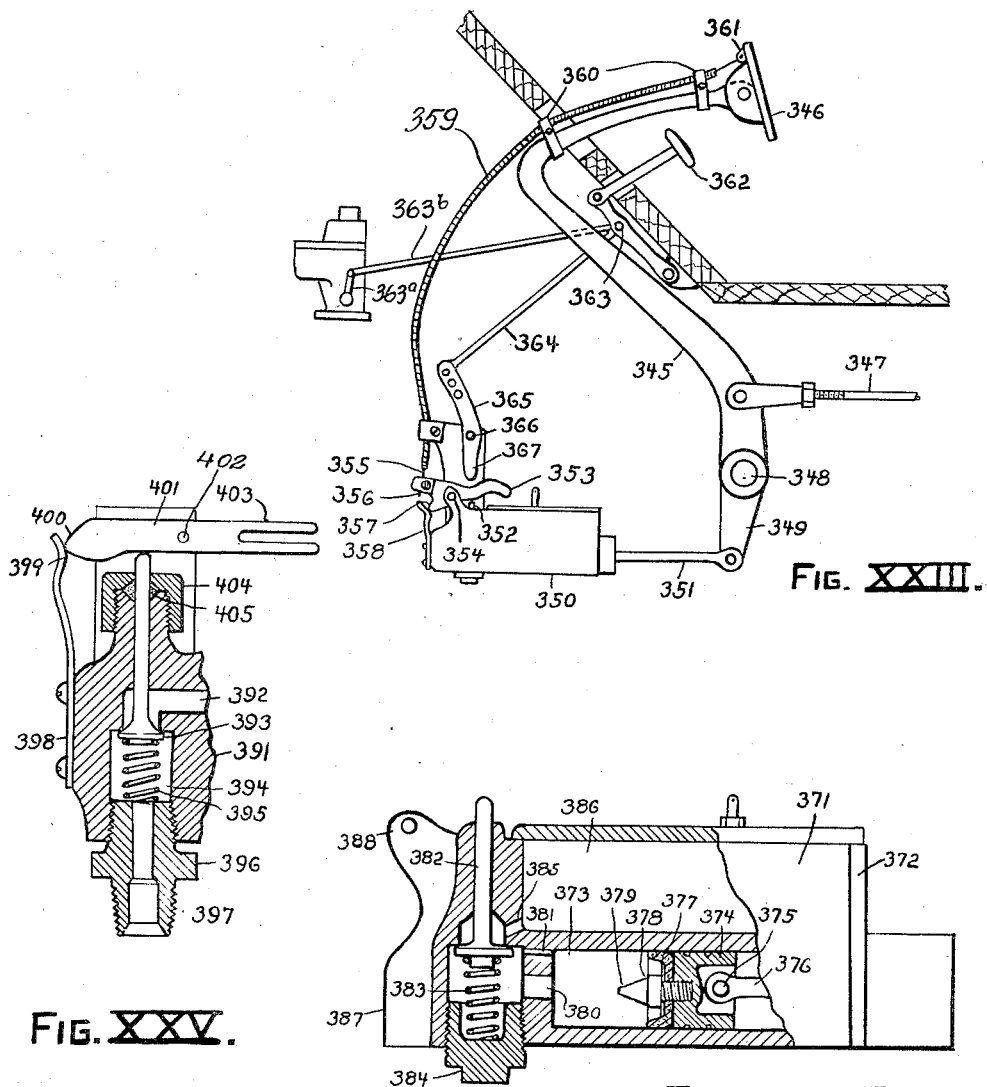

Patented May 11, 1937

2,080,295

UNITED STATES PATENT OFFICE 2,080,295

BRAKE CONTROL

Phillip R. Wheeler, Alexandria, Va., and Rasmus Christensen, Landover, Md.

Application November 4, 1932, Serial No. 641,258

30 Claims. (Cl. 192—3)

The object of this invention is to provide simpler and more convenient control for brakes on any automotive vehicle. By control is meant manual means for setting or releasing the brakes at any desired degree of tightness and means operable by mechanism usually operated in putting the car in motion, such as the accelerator, or parts or conditions controlled by it as manifold vacuum, or clutch operator or operating parts, to release the brakes.

The inventors are well aware that such a general form of control is not entirely new to the art and consequently do not expect to obtain basic protection except for the particular parts and combinations of parts which are believed or found to be their own inventions. Consequently the drawings, specifications and claims are limited to what is believed to be the true invention.

A further object of this invention is to provide means for setting or releasing the brakes by the operation of a valve controlling a fluid means and by fluid means is meant either a liquid as shown in this application or a gas as will be shown in an application which shall be a continuation of this application.

A further object of this invention is to provide means on the brake pedal itself for opening or closing the above mentioned valve, and other automatic means for opening the valve.

A further object of this invention is to provide a single valve which shall act both as a shut-off and as a by-pass.

A further object of this invention is to provide for setting or releasing of the brakes by a control on the gear shift lever in combination with means for releasing the brakes from an accelerator mechanism or from automatic clutch mechanism.

A further object of this invention is to provide means, in conjunction or in combination with the above means for setting or releasing the brakes, to release the brakes when the car is put in motion.

A further object of this invention is to provide means for setting or releasing mechanically operated brakes, this means to be controlled in any of the manners shown in this application.

A further object of this invention is to provide such means for setting and releasing the brakes as shall operate with the greatest convenience and minimum of effort on the part of the driver.

A further object of this invention is to provide such controls as may be readily installed on any car, or vehicle whether the vehicle be equipped with mechanical, hydraulic, air, vacuum or other means of operating or boosting the brakes, these controls being adaptable to be sold as accessories or to be installed as regular equipment.

Figure I shows a side view of a brake pedal and hydraulic brake pressure cylinder, the cylinder having a valve operated by the brake pedal foot pad and the accelerator.

Figure IA is a front view showing a detail of the parts indicated.

Figure IB shows a partial view of Figure I with certain of the parts modified to accommodate the valve of Figure III.

Figure II shows a diagrammatic view of a fluid operated brake system having a valve inserted in the fluid system in such a way that the brakes may be maintained applied at the will of the operator, and will automatically release when the car is put in motion.

Figure IIA shows a view of a hydraulic brake assembly in brake drum.

Figure III shows a sectional view of one type of valve which may be used to maintain the pressure in the fluid system.

Figure IV shows a side view of a brake pedal and a fluid pressure cylinder, the pressure cylinder having a valve controlled by the brake pedal foot pad and the clutch pedal.

Figure V shows a side view of a fluid pressure cylinder having a valve controlled from the gear shift lever and the accelerator pedal.

Figure VI shows a sectional view of a valve with a by-pass for use with a fluid pressure system and any of the controls shown in this application.

Figure VII shows another sectional view of the valve shown in Figure VI.

Figure VIII shows a side view of a brake pressure cylinder for use with fluid pressure operated brakes, there being associated with the cylinder a valve controlled by the brake pedal foot pad and a fluid operated clutch.

Figure IX shows a side view of a brake pressure cylinder for use with fluid operated brakes, there being associated with the cylinder a valve controlled from the gear shift lever and by a fluid operated clutch.

Figure X shows a fluid pressure cylinder with a valve controlled from the dash and from the accelerator pedal.

Figure XI shows a sectional view of a brake pressure cylinder having a valve and a by-pass.

Figure XII shows a sectional view of a valve and by-pass which may be inserted in the main line of any fluid pressure brake system and controlled by any of the means shown.

Figure XIII shows a side view of a brake pedal for a mechanical brake system, this pedal having a hydraulic latch controlled by the brake pedal foot pad and the accelerator.

Figure XIV shows a side view similar to Figure XIII except that the latch is controlled by a button on the dash and by the accelerator.

Figure XV shows a hydraulic latch for a mechanical brake system controlled by the brake pedal foot pad and by the clutch pedal.

Figure XVI shows a diagrammatic side view of a mechanical brake system having a hydraulic latch on the brake pedal.

Figure XVII is a sectional side view of a hydraulic latch which may be used with any of the controls shown for mechanical brake systems.

Figure XVIII shows a sectional top view of the control valve of Figure XVII.

Figure XIX shows a hydraulic latch for a mechanical brake system controlled from the gear shift lever and clutch pedal.

Figure XX shows a hydraulic latch for a mechanical brake system controlled from the gear shift lever and the accelerator.

Figure XXI shows a hydraulic latch for a mechanical brake system controlled with a brake pedal foot pad and a fluid or vacuum operated clutch.

Figure XXII shows a hydraulic latch for a mechanical brake system controlled from the gear shift lever and a fluid or vacuum operated clutch.

Figure XXIII shows a side view of a hydraulic latch with a poppet type of valve operated from the brake pedal foot pad by means of a Bowden wire, the accelerator being connected to release the brakes.

Figure XXIV shows a sectional view of a hydraulic latch with a poppet type of valve.

Figure XXV shows a sectional view of a poppet type of valve which acts both as a shut-off and as a by-pass and which may be integral with a hydraulic brake system pressure cylinder or may be provided with a nipple for attaching to any of the pressure cylinders now in use.

Referring to Figure I, a brake pedal is shown at 1 and a fluid pressure cylinder at 2. The pedal swings about the shaft 3 and has a connection 4 to the pressure cylinder plunger. The pressure line leading to the actuating parts in the brake drums is shown at 5. Inserted between the pressure cylinder and the main line is a poppet type of valve 6. (See Figure XXV.) The valve 6 may be any of the other types shown in this application or of any other desired form or type.

The end of the lever 7 engages the stem of the valve 6. The lever 7 is mounted on the pin or shaft 7a and its slotted end is engaged by the lever 8 at 7b. The lever 8 is supported on the pin 9 and has its other end extending through the hole 10 in the rod 11. The section of the rod 8 to the right of the pin 9 is a circle arc about the shaft 3. Thus as the brakes are applied or released, the brake pedal and rod 11 move along rod 8 without causing movement of 8. The rod 11 is slidably supported on the brake pedal at the points 12. The upper end of the rod is connected to the bell crank 13 which is attached to the pedal by the pin 14. The other end of the bell crank is attached at 15 to a rod 16. This rod is guided at the points 17 and is attached at 18 to a pivoted foot pad 19.

The foot pad is secured to the brake pedal by the pin 20. The lower end of the foot pad is supported at 21 but the upper end has a limited movement to the right. The position and angle of the foot pad is such that the foot of the operator normally exerts a pressure on the lower edge, maintaining the foot pad against the stop 21.

When it is desired to operate the valve 6, the operator presses down the top of the foot pad, causing movement of the rod 16 the bell crank 13 and the parts 11, 8 and 7. This permits the valve 6 to close and maintain the fluid pressure in the brake system. Thus the foot may be removed from the foot pad and the brakes will remain applied. This is very convenient while waiting on a grade in traffic.

The brakes may be released by tipping the foot pad back to its normal position and opening the valve or they may be released by operating the accelerator as is done normally in starting. The accelerator 22 is connected to a lever 23. This lever is attached to a shaft 24 which has any desired connection to the carburetor or other speed control or throttling device. As shown the accelerator is connected to a throttle valve at 22a, by means of the rod 22b. The pin 25 connects the rod 26 to the lever 23. The other end of 26 is connected at 27 to an arm 28. This arm is pivoted at 29 and has an adjustable end 30. A support 31 carries a detent spring 32 which engages the end of 7 and tends to hold the valve 6 in the open or the closed position. A packing nut is shown at 33.

The adjustment of the screw 30 is such that when the valve 6 is open, the screw clears the end of the lever 7. If the valve 6 is closed, the screw 30 engages the end of the lever 7 during the first part of the movement of the accelerator. This opens the valve 6 so that the displaced fluid in the line flows back into the pressure cylinder, thus releasing the brakes. In operation the brakes are normally applied and released the same as any conventional brakes. If, however, a stop is made on a grade, the operator merely has to apply the brakes and tip his foot forward, thus moving the foot pad and closing the valve 6. The foot may then be removed from the brake pedal. The brakes may later be released by tipping the foot pad back or by pushing on the accelerator as is normally done in starting.

The connection between the accelerator and the valve is such that the valve is opened simultaneously with the accelerator, thus releasing the brakes at the same time the operator desires to put the car in motion.

In Figure IB the plunger type of valve of Figure III has been substituted for the poppet type of Figure I. The description of Figure I applies also to Figure IB, except for the valve 50, the detail of which is shown in Figure III.

In Figure II is shown a diagrammatic plan view of a fluid operated brake system having a valve inserted between the pressure cylinder and the main line. Brake drums containing fluid operated brake means are indicated at 35. Tubing leading to the brakes is shown at 36. This tubing connects at 37 to a valve 38, the valve being connected to the fluid pressure cylinder 39. This valve as shown has a connection to the accelerator 41 and a connection 42 to the brake pedal foot pad 43. A throttle connection to the accelerator is shown at 41a. The valve, however, may be operated in any of the manners shown in this application. A clutch pedal is indicated at 44. The valve and the controls for operating it may be any one or any combination of those shown in the drawing, though the preferred type of valve is shown in Figs. XXIV and XXV.

In Figure IIA is shown a brake drum 35, brake lining 35a, brake shoe 35b, hydraulic cylinder 36a, and release spring 35c. The pins 35e connect the shoe to the axle flange 35f. This is shown as a representative form of brake, but the fluid lock means is applicable to any kind of brake.

In Figure III is shown a plunger type of valve which may be used as a shut-off valve with any of the controls shown. Threaded nipples 46 are provided for making connection to a pressure source and to a pressure line, or supply reservoir. A plunger 47 has an annular recess 48 which is adapted to shut off or permit flow through the passage 49. The head 50 is secured to the plunger. The spring 51 engages this and tends to normally move the valve in the closed position but is not strong enough to overcome the detent spring 32 which will hold the valve in either the open or the closed position. Rubber or other resilient boots 52 and 53 cover the ends of the valve and serve to keep the plunger clean. Figs. XI and XII show transverse sections of this plunger type of valve as used with a by-pass. In the operation of this type of valve the annular recess 48 (see Fig. III) normally lines up with the passage 49 and provides an open passage for the flow of fluid to apply the brakes or release them. However, when it is desired to set the brakes, the plunger 47 is moved to the position shown so that the passage 49 is cut off.

Referring to Figure IV, the brake pedal, foot pad, and fluid pressure cylinder parts are similar to those shown in Figure I. A rotary type valve is shown at 56. A valve of this type is shown in detail in Figures VI and VII. An arm for turning the valve is connected at 57 to the link 58 and the screw 59. The screw 59 has an adjustment 60. The bell crank 61 is pivoted at 62 and has its end 63 connected with the link 64 to the clutch pedal 65. The clutch pedal has adjusting screws 66 for adjusting its operating position. The lever 67 is pivoted at 62 and has a pin connection to the link 58. Part of the lever 67 is a circle arc about the shaft 68 which supports the brake and clutch pedals.

In operation the valve 56 normally remains open but may be, if the clutch pedal is depressed, closed or opened by tilting the foot on the brake pedal foot pad. When the car is stopped on a grade, if the clutch pedal is held depressed, the brakes may be applied with the right foot and the valve closed by tilting the foot. The foot may then be removed and the brakes will remain on. In starting the valve is opened and the brakes released by the movement of the clutch pedal. As the clutch pedal 65 is released to engage the clutch, the link 64 connected to the pedal causes movement of the bell crank 61 about its pivot 62. As the end of the bell crank moves upward it engages the nuts 60 causing a movement of the valve 56 to the open position thus releasing the fluid pressure in the line 5 and releasing the brakes. The adjustment 60 is so set that the valve is opened slightly before or simultaneously with the engaging of the clutch. This relieves the right foot from holding or releasing the brake so that it is free to operate the accelerator.

Referring to Figure V, a brake pedal is shown at 70, this having connection to a fluid pressure cylinder which may be similar to that of Figure I or of any desired form. The valve 56 may be similar to that of Figure IV. This valve has an operating arm 71 which is connected at 72 to the rod 73. The other end of the rod is connected to one arm of the bell crank 74. The other arm of the bell crank 74 is connected to the rod or wire 75 which has the manually operable end 76 located near the handle 77 of the gear shift lever. This rod or wire 75 is at all times free to slide up and down, as it is not locked in any one position by the control 76. The accelerator 78 has a connection 79 to the bell crank 80 and a connection 78b to the throttle 78a. The end 81 of the bell crank is adapted to engage the operating arm 71 of the valve 56. This engagement is adjusted so that it takes place as the accelerator is pushed off from the idling position.

Thus when the accelerator is released the brakes may be applied by depressing the pedal 70. The valve 56 may then be closed by operating the control 76 to pull on the wire or rod 75, thus holding the fluid in the line 5 and maintaining the brakes applied. The brakes may then be released with the control 76, or if not released here will be automatically released when the accelerator is pushed as in starting. None of the operating rods, levers, pins, etc., are normally locked, but are held in open or closed position merely by the friction of the valve if a valve like that of Figures VI or VII is used, or by a detent if a valve like that of Figure XXV is used.

In Figures VI and VII is shown a valve and by-pass construction which may be used with any of the controls shown. The valve and by-pass may be made integral with the pressure cylinder or may be made separate and inserted between the cylinder and the line leading to the brakes.

The valve body is designated at 85, this having the drilled passage 86. A cone shaped valve 87 has the passage 88. This valve has the extension 89 to which an arm may be attached to operate the valve. A packing nut 90 secures the packing 91. A spring 92 is held in place by a cover 93. The spring serves to keep the valve 87 tight. Two drilled passages 94 and 95 are connected by the passage 96. A by-pass valve 97 seats on the by-passage 94 and is kept closed by the spring 98.

As shown, the left end of the passage 86 is the outlet as the brakes are being applied. In case the port 88 should be turned so as to close the passage 86, fluid will flow to the brakes by means of the by-pass valve and passages shown.

In Figure VIII, the brake pedal, brake pedal foot pad, pressure cylinder, and valve are similar to those shown in Figure IV. The release of the valve is by a connection to a fluid operated clutch. This clutch as shown is of the so-called vacuum or automatic type though it may be operated by any fluid pressure means.

A clutch pedal 100 has a lug 101 which engages the lug 102 of an arm 103. The arm 103 connects to the rod 104 which operates the clutch 105. Also secured to the arm 103 is the rod 106 which has connection to a diaphragm 107, this being contained in the cylinder 108. The plunger rod 106 has a bleed slot 109.

The rod 110 connects the clutch operating arm 103 to a bell crank 111 which has a hole in one end which fits over the screw 59, the screw 59 being connected at 57 to an arm which operates the valve 56. This has the adjustment 60 as in Figure IV.

A fluid pressure line 112 connects control valves with the cylinder 108. The control valves shown are similar to those now commonly used. The plunger 113 has a connection 114 to a throttle operating rod 115. This is connected to a throttle 115a by a rod 115b. The plunger 113 has a vacuum passage 116, an air slot 117 and a bleeder slot 118. A bleeder connection to the cylinder 108 is shown at 119. An inlet air valve is shown at 123. The plunger 120 is for shutting off the vacuum line 121 to render normal manual operation of the clutch. The plunger has a control connection 122 for operating it. In operation the vacuum clutch is similar to those now commonly used.

In operation the valve 56 may be opened or closed by movement of the brake pedal foot pad. If the brakes are applied and the valve closed, the right foot may be removed from the brake. As the clutch is disengaged by fluid pressure when the foot is removed from the accelerator, the left foot is also free. When starting the accelerator is depressed. This causes the engagement of the clutch and the clutch opens the valve 56 and releases the brakes.

In Figure IX, the pressure cylinder for the brakes and the fluid operated clutch and control are similar to the same parts in Figure VIII. The valve 56, however, is operated from a control on the gear shift lever instead of from the brake pedal foot pad.

The Bowden wire 125 connects to the arm 126, this arm being secure to the valve 56. The Bowden wire is attached to a control 127 on the gear shift lever 128.

In operation the brakes may be applied and released as usual under normal conditions. When stopped on a hill they may be applied and then set by using the control on the gear shift lever. They may also be released with this control if desired. However, if they are set from the gear shift control, both feet will then be free as the clutch is normally held disengaged by the fluid control at any time the throttle is released. In starting, the accelerator causes the engagement of the clutch, and this in turn releases the brakes. Thus when a stop is made on a grade, one may set the brakes and start without giving them further thought.

In Figure X the valve is operated from a control on the dash and from the accelerator. A button 130 on the dash is connected through the bell crank 131 and the rod 132 to the valve operating arm 133. This arm is engaged by a lever 134 which is pivoted at 135 and connected by means of the rod 136 to the accelerator control 137. The accelerator is connected to a throttle 137a by a rod 137b.

The brakes, when applied with the brake pedal, may be set or released with the button or dash control 130. Or if set with the dash control may be released with the accelerator as the accelerator is depressed in starting. The controls would normally be set to release as the accelerator is pushed off from the idling position, though they may be set otherwise.

In Figure XI a fluid pressure unit has a bore 140 and a piston 141, the piston having the flexible cup 142 in front of it. A rod 143 connects the piston to the brake pedal. A bellows 144 covers the open end of the piston and bore. A reservoir 145 holds a supply of fluid. This has a vent 146 and ports 151 and 152.

The end of the bore has a head 147 which contains a shut-off valve 148 (see Figure III) and a by-pass valve 149. A threaded portion 150 is for connection to a tube or pipe leading to the brakes. This pressure unit having a valve and a by-pass built into it may be used with any of the control systems shown.

In operation, the shut-off valve normally remains open, the piston movement being controlled with the brake pedal. At any time a stop is made on a hill, the valve 148 may be operated in any of the manners shown. If at any time the valve should be accidentally closed, fluid will go through the by-pass as the brakes are applied.

In Figure XII is shown a shut-off valve and by-pass similar to the one shown in Figure XI, except that it is made separate and may be used as an attachment to any existing pressure unit. It may be inserted between the pressure unit and the main line or anywhere in the main line.

A body 155 carries a plunger type of valve 156. This plunger has an annular relieved part 157 (see 48 Figure III). A by-pass valve 158 is held in place with a spring 159. The inlet passage 160 has a threaded end 161. The outlet 162 has the threaded end 163. The plunger valve of Figs. III, XI, and XII may be operated from any of the positions shown by the use of suitable linkage. That is it may be operated from the brake pedal foot pad, from the gear shift lever, from the dash, accelerator, clutch or any of the places shown or described.

In Figure XIII the controls are in general similar to those of Figure I except that they are used with a mechanical brake system instead of a hydraulic brake system as in Figure I. A brake pedal is shown at 165. This is supported on the shaft 166 and has the arm 167. The arm 167 is secured to the piston rod 168. (See Figure XVII for a section of a similar cylinder and valve. Fig. XXIV shows a modified form.) The piston rod 168 enters a cylinder 169. This cylinder has a reservoir 170. The reservoir and cylinder have a connecting passage controlled by a valve 171. The general arrangement of this cylinder and valve may be as shown in Fig. XVII or the poppet type of valve shown in Fig. XXIV may be used if the connecting linkage is modified to suit.

This valve has an arm 172. This arm is connected by a link 173 to the lever 174, this lever having a stationary pivot 175. The end 176 is a circle arc about the brake pedal shaft 166. This end which is a circle arc passes through a loop 177 in the sliding rod 178. This rod is connected to a bell crank 179, the bell crank being pivoted at 180. The other arm of the bell crank is connected by means of the rod 181 to the hinged foot pad 182.

As the brake pedal is pushed down or released, the loop 177 of the sliding rod 178 moves over the circle arc 176 without causing it to be displaced. However, if at any place the hinged foot pad is tipped forward, the motion is transmitted through the link 181 and the bell crank 179 to give an upward motion to the rod 178 and loop 177. This causes the rod 176 to hinge about the pin 175 and pull the arm 172 to the right. This closes the valve 171 cutting off the flow of fluid from the cylinder to the reservoir. This prevents the piston rod 168 from returning to the left and so holds the brakes applied.

A spring 183 engages flat surfaces on the end of the arm 172. This acts as a detent, tending to hold the valve in either the open or the closed position.

An arm 184 has an adjustment 185. This arm is pivoted at 186 and connected by the rod 187 to the accelerator control 188. The accelerator is connected to a throttle 188a by a rod 188b.

When the valve 171 is closed by operation of the brake pedal foot pad 182 and the connecting linkages, it may be opened again by tipping the foot pad back. Or it would normally be opened by the operation of the accelerator in starting the car. As the accelerator is moved off from its idling position the adjustment 185 moves downward, engaging the cam face on the arm 172, moving the arm to the left. This opens the valve and permits the piston rod 168 to return, thus releasing the brake pedal 165 and the rod 189 which actuates the brake linkage. The valve is normally opened during the first part of the movement of the accelerator motion though it may be otherwise adjusted.

In Figure XIV the hydraulic latch is, generally speaking, similar to the one used in Figure XIII but the control is different. The valve is closed or opened from a button control on the dash and also may be opened by the operation of the accelerator.

A brake pedal 195 has the arm 196 and is pivoted at 197. The rod 198 connects with linkage going to the wheels for operating the brakes. A piston rod 199 connects with a piston in the hydraulic latch cylinder 200. This cylinder has a reservoir 201. A valve 202 controls a passage from the reservoir to the cylinder. This valve has an operating arm connected at 203 to a Bowden wire or other control 204 leading to a button 205 on the dash, or other convenient location such as the steering column or wheel. An accelerator 206 has a connection 207 to a bell crank 208, a throttle 206a is connected by the rod 206b to the accelerator pedal 206. This bell crank has the adjustment 209 for engaging the arm 210 which is secured to the valve. This has a detent spring 211 similar to Figure XIII.

In operation the passage between the reservoir and the latch cylinder is normally open, fluid being sucked into the cylinder as the brakes are applied and pushed out as they are released. If it is wished to set the brakes, this may be done by closing the valve 202 by means of the button control 205, this being done while the brake pedal is held. The fluid trapped in the cylinder then holds the brake pedal or other brake actuating part and so holds the brakes applied.

In starting the brakes are released by the normal operation of the accelerator pedal. Thus the brakes are held applied while waiting on a grade in traffic and are automatically released as a start is made.

In Figure XV the hydraulic latch is controlled by the brake pedal foot pad and the clutch pedal. That is, as long as the clutch pedal is depressed, the brakes may be set but they are released as the clutch pedal is released.

The brake pedal and foot pad may be similar to those of Figure XIII. The latch cylinder, reservoir and valve may also be similar. The valve 215 has an operating lever 216. One end of the lever is connected by the link 217 to the brake pedal foot pad operating linkage. The other end is connected with the rod 218 to the clutch pedal. This rod has an adjustment 219 and a slotted end 220. The slotted end permits the clutch, when the valve 215 is open to operate without moving the valve. When, however, the valve 215 has been closed, the clutch pedal being depressed, the valve is opened simultaneously with the release of the clutch pedal. A spring 221 is secured to the reservoir body. This has a hump 222. The arm 223 engages the hump and tends to hold the valve 215 open when on one side of the hump and closed when on the other side.

In Figure XVI is a diagrammatic side view of a mechanical brake system having a hydraulic latch. The control indicated for the latch is similar to that of Figure XIII, though any of the controls shown may be used with a hydraulic latch and mechanical brakes.

At 224 and 235 are indicated brake drums having operators 225 and 226. Linkage 227 and 228 connects to a lever 229, this lever having a connection 230 to a brake pedal 231. The brake pedal has a connection to a hydraulic latch 232, this latch being controlled by the brake pedal foot pad 233 and the accelerator 234.

The brake linkage and the brake shoes may have many variations but this does not necessarily affect the operation of the hydraulic latch or its control in any of the manners shown.

Referring to Figure XVII, a hydraulic latch cylinder body is shown at 237. This has an integral reservoir 238. The reservoir has a vent 239. A valve 240 controls passages 241 connecting the reservoir and the cylinder. The valve is shown somewhat enlarged in Figure XVIII. A piston 242 is fitted in the cylinder. This has a rubber or other flexible or resilient seal 243. A tapered pin 244 enters the hole 245 as the piston reaches the end of the cylinder. This restricts the flow of fluid and acts as a shock absorber, bringing the brake pedal to an easy stop when it is released.

A by-pass valve 246 permits the flow of fluid into the cylinder when the valve 240 is closed. This permits the brakes to be applied at all times even though the valve 240 be accidentally closed.

The piston 242 has one end of the rod 247 connected to it. The other end of 247 is secured to the brake pedal, an extension of it or a part controlled by it. A rubber or other flexible boot 248 prevents dirt from getting into the open end of the cylinder.

Referring to Figure XVIII, the valve 240 is held in place with a spring 249 and cap 250. The construction is such that any leakage past the large end of the valve builds up pressure against its end causing the valve to seat more tightly. A packing 252 is held in place with a cap 251. The valve stem 253 extends outward and may have a lever or other means secured to it for operating the valve. (See 215 and 216 in Figure XV.)

Referring to Figure XIX, a brake pedal 255 is pivoted at 256 and has an arm 257. The arm is connected to a piston rod 258. This rod is part of the hydraulic latch 259. The latch has the valve 260. This valve has two arms, one secured to a Bowden wire or other control 261 and the other to a slotted part 262.

The connection at 261 leads to a control 263 on the gear shift lever, this control being used to open or close the valve 261. The connection at 262 is secured at 264 to the clutch pedal 265. This connection permits the valve 260 to be closed when the clutch pedal is depressed as shown; but opens the valve 260 when the clutch pedal is released to engage the clutch.

A connection 266 leads to the brake operating linkage. A detent spring 267 engages the arm 268 and acts to hold the valve 260 open or closed. A spring 269 helps to return the valve to its open position.

Referring to Figure XX, a brake pedal is shown at 270. This is pivoted at 271 and has the arm 272. The connection 273 leads to the brake operating linkage. A piston rod 274 connects with a hydraulic latch 275. A valve 276 has an arm 277 for operating it. This arm has an extension 278 which engages a spring detent 279 acting to hold the valve in either the open or the closed position. A spring 280 helps to return the valve to its open position.

A Bowden wire, or other connection, 281 leads to a control 282 on the gear shift lever. This control may be used for either opening or closing the valve 276. The accelerator pedal 283 has a connection 284 to a member 285 and a connection 283b to a throttle 283a. This member has a pin support at 286 and engages the valve arm 277 as the accelerator is pushed. This opens the valve which remains open until closed again by the control on the gear shift lever.

Referring to Figure XXI, a brake pedal 322, similar to the one used in Figure XIII, is shown. This has a hinged foot pad 323, a link 287, a bell crank 288, and the sliding rod 289. The loop 290 slides over the curved portion 291 of the member 292. This member is pivoted at 293 and connected by the link 294 to the arm 295 of the valve 296. A detent spring 297 engages a lug on the arm 295 and tends to hold the valve open or closed. The adjustment 298 is engaged by the bell crank 299 which is pivoted at 293. The link 300 connects the other arm of the bell crank 299 to the clutch operating arm 301.

The brake pedal 322 has an arm 302 which connects to a piston rod 303 of the hydraulic latch 304. This latch may be similar to that shown in Figure XVII. The clutch operating arm 301 is connected to the piston rod 305 of the fluid pressure cylinder 306. The rod has a vent 307 and the cylinder a valve 308. The cylinder has a diaphragm 309 and a connection 310 leading to control valves 311 and 312.

Valve 311 has a reduced section 313 and slots 314 and 315. The tube 316 serves to connect the air bleed 315 with the cylinder 306. A rod 317 connects valve 311 to the accelerator 318. This is connected to a throttle 318a by a rod 318b. The valve 311 is controlled by movement of the accelerator. It controls the pressure in the line 310, this pressure controlling the operation of the diaphragm 309 and this in turn operating the clutch. The valve 312 has a control connection 319 to the dash or other convenient location. This valve is a shut-off for the line 320 which connects to an intake manifold or other pressure source.

The brake pedal has a rod 321 leading to the brake operating linkage.

In operation, the brakes are normally applied and released in the usual manner. When, however, the car is stopped on a hill, the brakes may be set by applying them and tipping the brake pedal foot pad forward. This operates the valve 296 and sets the hydraulic latch. If desired, this latch may be released by tipping the foot back to its normal position. Or a start may be made in the usual manner with no thought of the brakes, they being automatically released as the clutch is engaged. This release is accomplished through the clutch operating arm 301 and the bell crank 299. When the engine is idling the clutch is normally held disengaged by its fluid operating mechanism so that the brakes may be set and both feet relieved while waiting. Then only the right foot on the accelerator is needed to start as the accelerator controls the clutch operating cylinder and this in turn controls the clutch and release of the brakes.

Referring to Figure XXII, the hydraulic latch is controlled by a handle on the gear shift lever and by the fluid operated clutch. The fluid operated clutch and its control may be similar to the one shown in Figure XXI.

The brake pedal 330 has a connection 331 to the brake operating linkage. The valve 332 of the hydraulic latch has an arm 333. This arm has a connection 334 to a Bowden wire or other control leading to a handle 335 on the gear shift lever 336. An adjustable end 337 has a slot fitting a pin 338 of the valve lever 333. The rod 339 connects this slotted end with the clutch operating arm.

An arm 340 on the valve engages a spring detent 341 which serves to hold the valve 332 in either the open or the closed position.

In operation, the brakes are applied and released as usual. When stopped on a hill, the brakes may be set by applying them and closing the valve 332 by means of the handle 335 on the gear shift lever 336. They may also be released by operating the control on the gear shift lever, but are normally released by the operation of the fluid clutch control, the brakes being adjusted to release simultaneously, or slightly before the clutch is engaged.

Thus when stopped the brakes may be set, the car remaining in gear or out of gear and both feet free. Only the right foot is required in starting as the accelerator controls the fluid clutch operator and that in turn controls the brake release and clutch engagement.

Referring to Figure XXIII, a brake pedal is shown at 345. This has a pivoted foot pad 346 and a rod 347 for connection to brake operating linkage. The brake pedal is supported on the shaft 348 and has an extension 349.

At 350 is a hydraulic latch of the type shown in Figure XXIV, though this may be of any desired type. The rod 351 connects the latch piston with the brake pedal arm 349. A valve 352 is operated by a lever 353, this being pivoted at 354. A Bowden wire 355, or other control, connects at 356. The detent lug 357 engages the detent spring 358, and tends to hold the valve in either the open or the closed position.

The Bowden wire housing 359 is secured at 360 to the brake pedal.

The end of the wire 355 is attached to the foot pad 346 at 361. An accelerator control 362 has a connection at 363 to a rod 364 leading to the lever 365 and a connection 363b to a throttle 363a. This lever is pivoted at 366. The end 367 engages the lever 353 when the accelerator control is operated, provided the valve 352 has previously been closed.

In operation, the brakes are normally applied and released as usual. If it is desired to set them, this may be done by applying them and then tipping the foot pad, this lifting the end 353 of the valve operating arm and permitting the valve 352 to close. The piston in the hydraulic latch is then prevented from returning and remains in the brakes-on position.

The brakes may then be released by tipping back the foot pad or by operating the accelerator.

Referring to Figure XXIV, a hydraulic latch body is shown at 371. This has a flange 372 for securing it to a part of the engine or car structure. A cylinder bore 373 has a piston 374. This piston is secured at 375 to a connecting rod 376. The front of the piston carries a flexible cup 377, this being secured to the piston with the screw 378. The tapered end 379 of the screw is adapted to enter the passage 380 and restrict the flow of fluid as the brake pedal comes back to its normal position. This acts as a shock absorber and brings the pedal to an easy stop.

A small passage 381 is located so that any air in the cylinder will be forced out. A poppet type of valve 382 has a spring 383 between the valve head and the plug 384. This spring closes the valve when the actuating lever is moved upward from the end of the valve stem. A port 385 connects the reservoir 386 with the valve passage.

The part 387 furnishes support for the detent spring and 388 supports the valve opening lever.

The operation of this latch is similar in principle to that of the others previously described. The poppet type of valve used in this latch, however, serves as both a shut-off and a by-pass valve and requires only a very small movement to open or close it.

In Figure XXV is shown a poppet type of valve suitable for use with a fluid pressure cylinder such as is used for the operation of fluid operated brakes. That is, this valve may be combined with the hydraulic cylinder of hydraulic brakes or put in the exhaust port or pressure line going to the operating cylinder in air operated brakes, as will be shown in a continuation of this application. By air operated is meant either below or above atmospheric pressure as vacuum or compressed air.

The valve body 391 may be integral with the pressure cylinder as in Figure I, or may be separate as in Figure XII. The body has the passage 392 connecting with a pressure source. The valve 393 seats in the passage 394. A spring 395 fits against the head of the valve and is held in place with the fitting 396. This fitting has a threaded end 397 for connection to a pipe or tube. A detent spring 398 has a detent 399 which engages the end 400 of the valve operating lever 401. This lever is pivoted at 402 and engages the end of the valve stem. The end 403 is for connection to controls, which may be any of those shown in this application.

A packing nut 404 holds packing material 405 about the valve stem.

The advantage of this type of valve is that only a very slight movement is required to operate it and that it acts both as a shut-off and as a by-pass in case it should become accidentally closed. Experience has shown that in actual use this valve opens easily against such pressures as are encountered in brake systems.

We claim:

1. In an automotive vehicle a brake system using fluid pressure as a transmitting means, a valve located in the fluid pressure system, mechanism operable from the brake pedal and by an operator's foot on the brake pedal and at any position of the brake pedal to cause the brakes to remain set at that degree of tightness after the foot has been removed, and means operable by the accelerator to cause the brakes to release.

2. In an automotive vehicle, wheels having rotating braking drums, braking parts to engage the drums, a brake pedal with a pivoted foot pad for operating the braking parts, fluid means operable between the brake pedal and the actuating elements at the wheels, a valve in the fluid transmitting line, means operable by the foot pad of the brake pedal for opening or closing the valve, and means operable from the accelerator pedal for opening the valve.

3. In a hydraulic brake system for automotive vehicles, a pressure cylinder operable by a brake pedal with a pivoted foot pad, a valve in a passage on the pressure side of the said pressure cylinder, mechanism operable from the said pivoted foot pad of the brake pedal to open or close the valve, and means operable from a clutch pedal to open the valve.

4. In a hydraulic brake system for road vehicles, a brake pedal, a pressure cylinder operable by a brake pedal with a pivoted foot pad, a valve on the pressure side of the said pressure cylinder, means operable from the foot pad of the brake pedal to actuate the valve and means operable from an automatic clutch mechanism to open the valve.

5. In a hydraulic brake system, a pressure cylinder, a valve on the pressure side of the said cylinder, the valve being adapted to cut off the cylinder from the pressure transmitting line and maintain the pressure in the line, a brake pedal having a pivoted foot pad, connection between the said foot pad and valve for opening or closing the valve, and means operable by the accelerator for opening the valve.

6. In a road vehicle, a brake system having wheels with brake drums, braking means operable on the drums, a brake pedal for operating the brake means, hydraulic means for maintaining the brakes in a braking condition, a gear shift lever, mechanism operable from the gear shift lever to set the hydraulic means, and mechanical means operable by the accelerator to release the hydraulic means.

7. In a road vehicle, a brake system having wheels with brake drums, braking means operable on the drums, a brake pedal with a pivoted foot pad for operating the brake means, hydraulic means for maintaining the brakes in a braking condition, mechanism operable from the foot pad of the brake pedal for setting or releasing the hydraulic means, and mechanism operable from the accelerator to release the hydraulic means.

8. An accessory for automobiles comprising a valve to be placed in a hydraulic brake system, a brake pedal, means on the brake pedal for closing or opening the said valve, and connections between the said valve and the accelerator whereby the valve may be opened by a movement of the accelerator.

9. Claim eight and a by-pass for the said valve.

10. An accessory for automobiles comprising a manually controlled valve capable of maintaining a fluid medium in the same state which it assumes when the brakes are applied, a brake pedal, means on the brake pedal for closing and opening the said valve, and parts adapted to connect with the accelerator control, these parts being designed to open the said valve upon a movement of the accelerator, if the said valve is in a closed position.

11. An accessory for automobiles comprising a manually controlled valve capable of maintaining a fluid medium in the same state which it assumes when the brakes are applied, a pivoted foot pad on a brake pedal, connection between the foot pad and a member which forms a circle arc about the pivot axis of the brake pedal, means operably connecting the said circle arc member to the said valve and means operable between the accelerator and the valve to open the valve on a movement of the accelerator if the valve is in a closed position.

12. An accessory for automobiles comprising a manually controlled valve capable of maintaining a fluid medium in the same state which it assumes when the brakes are applied, a pivoted foot pad on a brake pedal, connection between the foot pad and a member which forms a circle arc about the pivot axis of the brake pedal, means operably connecting the said circle arc member to the said valve, and means operable between the valve and the clutch operating mechanism to open the valve, if the valve is in a closed position.

13. An accessory for automobiles comprising a manually controlled valve capable of maintaining a fluid medium in the same state which it assumes when the brakes are applied, a brake pedal with a foot pad capable of relative movement between itself and the brake pedal, operable connection between the foot pad and the said valve, and other connecting means between a vacuum operated clutch part, and the said valve.

14. An accessory for automobiles comprising a manually controlled valve capable of maintaining a fluid medium in the same state which it assumes when the brakes are applied, a gear shift lever, means located on the gear shift lever having operable connection with the said valve, and mechanical connection with the accelerator for opening the said valve upon a movement of the accelerator if the valve is in a closed position.

15. In a road vehicle having wheels with pneumatic tires, brake drums attached to the wheels, friction brake parts associated with the drums, a brake pedal with connections for applying the friction parts to the drums when the brake pedal is depressed, fluid means associated with the brake pedal, a manually controlled valve operable to maintain the fluid means in the same position which it assumes when the brake pedal is depressed, means associated with the brake pedal for closing or opening the said valve, the said valve also being operable by a connection to the accelerator to release the fluid means and permit it to return to the position which it assumes when the brake pedal is in the brakes off position.

16. An accessory for road vehicles comprising a manually controlled valve operable by relative movement between a brake pedal and a brake pedal foot pad, the said movement being capable of closing or opening the said valve, the said valve being operable to maintain a fluid medium in the position which it assumes when the brakes are applied, and means operable by a part of the clutch control and operating mechanism to operate the valve to permit the said fluid medium to return to the position which it assumes in the brakes off position.

17. An accessory for road vehicles comprising a cylinder, a brake pedal having a foot pad attached thereto, a valve operable by relative movement between the brake pedal foot pad and the brake pedal to maintain the same amount of fluid in the cylinder as that amount which is there when the brakes are applied, and a connection to a clutch control or operating part for moving the valve when the clutch is moved into the engaged position.

18. An accessory for road vehicles comprising a valve for controlling the flow of a fluid medium, a brake pedal having a hinged foot pad, connection between the hinged foot pad and a curved member, the curved member being normally located so that its curve is a circle arc about the hinge of the brake pedal, connection between the curved member and the said valve, so that the said valve may be operated by tilting the said foot pad.

19. Claim 18 and an operable connection between the said valve and a part normally moved when the car is started from a stopped position.

20. In a vehicle, a brake system, a brake pedal, means operable from the brake pedal by means of a Bowden wire to maintain a fluid medium in the same state which it assumes when the brakes are applied, and other means operating when the vehicle is put in motion to release the fluid medium.

21. In a vehicle, a brake system using a fluid means for applying force to the braking parts, a brake pedal, a foot pad with movement relative to the brake pedal, means operable from the brake pedal foot pad to maintain this fluid medium acting on the braking parts in the same state which it assumes when the brakes are applied, this said means operable from the brake pedal foot pad to release the brakes after they have been set and other means operating the first said means when the vehicle is put in motion to release the fluid medium if it is in a set condition.

22. In a vehicle, the combination with a brake system of a brake pedal, a pivoted foot pad on the brake pedal, a Bowden wire connected to the pivoted foot pad, a valve operable by movement of the said foot pad and the Bowden wire, the said valve being capable of maintaining a fluid medium in the same state which it assumes when the brakes are applied, and other means operable when the vehicle is set in motion to release the said fluid medium so that the brakes may release.

23. In a vehicle, the combination of a brake pedal, a fluid pressure cylinder, a fluid pressure brake system, means operable from the brake pedal to apply pressure from the said cylinder to the said brake system, a pivoted foot pad on the said brake pedal, a poppet valve in the fluid system between the said cylinder and brake applying means, and connection from the said foot pad to the said valve for closing or opening it.

24. Claim 23 and other means operating when the vehicle is set in motion to open the said valve if it is in the closed position.

25. In a vehicle, the combination of a brake pedal, a pivoted foot pad for the brake pedal, a fluid pressure cylinder associated with the brake pedal, a poppet valve acting as by-pass for fluid passing from the cylinder to the brake, and acting as a shut-off for fluid returning from the brake, a connection from the said foot pad to close or open the said valve and a connection to an accelerator part to open the valve.

26. In a vehicle, the combination of a brake pedal, a pivoted foot pad for the brake pedal, a fluid pressure brake system, a poppet valve in the fluid pressure system, the said poppet valve acting as a shut-off to maintain the brakes applied when it is closed and also acting as a by-pass to permit the brakes to be applied and connection from the said foot pad to operate the said valve.

27. Claim 26 and other means operating from the clutch mechanism to open the said valve if it is in the closed position.

28. In a vehicle, a fluid operated brake system, a brake pedal, a pivoted foot pad for the brake pedal, a poppet valve in the said fluid brake system, a Bowden wire connection from the said foot pad to operate the said poppet valve.

29. Claim 28 and a connection from the accelerator to open the valve.

30. Claim 28 and a connection to a clutch part to open the said valve.

PHILLIP R. WHEELER.
RASMUS CHRISTENSEN.